July 13, 1954

O. KORNEI 2,683,856

MAGNETIC-ELECTRIC TRANSDUCER

Filed Jan. 24, 1951

INVENTOR.
OTTO KORNEI
BY *Harry C. Page*
ATTORNEY

July 13, 1954   O. KORNEI   2,683,856
MAGNETIC-ELECTRIC TRANSDUCER
Filed Jan. 24, 1951   4 Sheets-Sheet 2

*INVENTOR.*
OTTO KORNEI
BY *Harry C. Page*
ATTORNEY

July 13, 1954   O. KORNEI   2,683,856
MAGNETIC-ELECTRIC TRANSDUCER
Filed Jan. 24, 1951   4 Sheets—Sheet 4

*INVENTOR.*
OTTO KORNEI
BY
ATTORNEY

Patented July 13, 1954

2,683,856

UNITED STATES PATENT OFFICE 2,683,856

MAGNETIC-ELECTRIC TRANSDUCER

Otto Kornei, Cleveland Heights, Ohio, assignor, by mesne assignments, to Clevite Corporation, Cleveland, Ohio, a corporation of Ohio Application January 24, 1951, Serial No. 207,625

12 Claims. (Cl. 322—2)

This invention relates to a device for translating magnetic energy to electric energy, or vice versa, through the medium of mechanical strains in the transducer material involved.

Various prior-art devices are effective to transduce energy of one type to energy of another type through the medium of strains in the material involved. Some devices of the type under consideration utilize the piezoelectric or the electrostrictive effect of the material involved to translate mechanical energy into electrical energy, or vice versa. Other such devices utilize materials having magnetostrictive properties and are effective to translate magnetic energy into mechanical energy, or vice versa. Still other devices transform mechanical energy into electrical energy by means of materials whose electrical resistance is strain dependent. Some of the mentioned, or related, devices depend in their operation upon the presence of more or less complex mechanical or electrical linkages, either to make the devices at all workable or to obtain the desired form of energy at a practical and useful impedance level. Heretofore there has been available no device for mutually transducing between the electrical and magnetic types of energy and which depends on the direct transfer of strain between two intimately and rigidly coupled suitable materials without resorting to complex mechanical or electrical linkages to obtain the desired transducer effect. Applicant has discovered a new transducing device of this character which is particularly well adapted for certain specific applications as will be set forth in more detail hereinafter.

It is an object of the invention to provide an improved transducer for transforming between electrical and magnetic types of energy.

It is a further object of the invention to provide an improved transducer of simplified form.

It is still another object of the invention to provide an improved transducer for transducing between very weak and slowly varying or constant magnetic fields and electrical energy, or vice versa.

In accordance with the invention, a device for transforming between at least two of the types of energy classified as electrical, magnetic, and mechanical comprises a first material having the reversible property of transducing between electrical energy and strains along a substantial dimension in the above-mentioned first material and a second material closely and rigidly coupled to the first material along a major portion of the above-mentioned substantial dimension and having the reversible property of transducing between magnetic energy and strains along the above-mentioned substantial dimension of said second material and forming with the first material a system which is mechanically resonant at a predetermined frequency. The device also comprises means for applying energy of at least one of the above-mentioned types thereto at predetermined operating frequencies which are substantially removed from the aforementioned predetermined resonant frequency and for deriving therefrom energy of at least one of the other of the above-mentioned types at said predetermined operating frequencies of the applied energy.

In accordance with a feature of the invention, a device for transforming between electrical and magnetic types of energy comprises a first body of a first material having the property of providing strains therein along a substantial dimension of that body when energy of one of the above-mentioned types is applied thereto and a second body of a second material, which has a substantial dimension closely and rigidly coupled mechanically to the first body along its above-mentioned substantial dimension and which has the property of providing, for strains along the aforementioned substantial dimension of the second body, energy of the other of the above-mentioned types. Means are also provided for applying energy of the said one of the types mentioned above to the first material to develop strains along the aforementioned substantial dimension of the first body and corresponding coupled strains along the aforementioned substantial dimension of the second body, and means for deriving the energy of the other type mentioned above from the second material which is developed therein as a result of the last-mentioned coupled strains therein.

For a better understanding of the present invention, together with other and further objects thereof, reference is had to the following description taken in connection with the accompanying drawing, and its scope will be pointed out in the appended claims.

Figure 1:
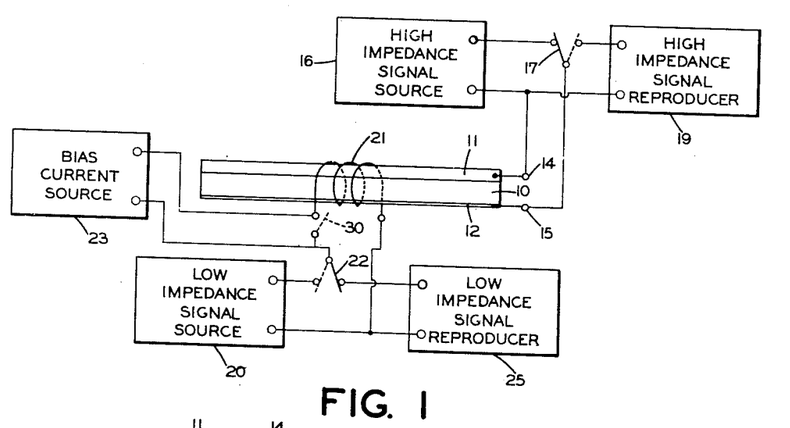
Fig. 1 of the drawings illustrates one embodiment of the invention which may be utilized to translate electrical energy from a rather high-impedance source to magnetic energy for use in a rather low-impedance signal reproducer or which, alternatively, can be utilized to translate magnetic energy associated with a low-impedance level to electrical energy at a high-impedance level.

Referring now more particularly to Fig. 1, there is shown a transducer in accordance with the present invention which comprises an electromechanically sensitive plate 10 and a plate 11 which is magnetostrictive. Specifically the plate 10 has the property of providing strains therein along its length when electrical energy is applied thereto and the plate 11 has the property of providing magnetic energy in response to a strain therein. The plate 10 may be comprised of a piezoelectric material such as Rochelle salt or may be comprised of an electrostrictive material which is effective to provide strains therein when electrical energy is applied to the plate. One material which has been found to be very satisfactory for use in the plate 10 is comprised primarily of barium titanate which has been fired to a high temperature and prepolarized by the application of a high D. C. voltage thereto in a manner which is generally well understood in the art and which is described in detail in United States Letters Patent 2,486,560, granted to Robert B. Gray on November 1, 1949, on an application filed September 20, 1946. The plate 10 is closely and rigidly coupled mechanically to the plate 11 along its length. This can be done, for example, by cementing together any of the substances mentioned above. However, material of the barium-titanate type mentioned above can be soldered to plate 11. The plate 11 can, for example, be comprised of nickel which has a very high magnetostrictive coefficient. Alternatively, any of the ferrous materials which have good magnetostrictive properties can be used. In some cases it is possible to fire a ceramic, such as the barium-titanate material mentioned above, to a metallic plate such as is required for plate 11. The relative thicknesses of plates 10 and 11 depend upon the materials which are to be used and upon the application for which they are to be used as will be explained in more detail hereinafter; and where a thin magnetostrictive plate is required, it is possible in some cases to provide the plate 11 by electroplating nickel or some other magnetostrictive material upon the electromechanically sensitive plate 10.

The electromechanically sensitive plate 10 is provided with an electrode 12 on the face thereof which is opposed to the face of the plate 10 which is bonded to plate 11. The plate 11 can then be used as the other electrode and electrical leads are thus brought out from the plate 11 to a terminal 14 and from the electrode 12 to a terminal 15, thus providing means for applying one type of energy, specifically electrical energy, to the dielectric material of plate 10.

For the purpose of providing an electrical input to the plate 10, a signal source 16 having a high-impedance output circuit is provided which may be coupled to terminals 14 and 15 by means of a switch having a blade 17. For the purpose of deriving and utilizing electrical energy from the plate 10, a signal reproducer 18 having a high-impedance input circuit is provided, which may be connected to terminals 14 and 15 when the switch blade 17 is in its dotted position. For the purpose of applying magnetic energy at a low-impedance level to the plate 11, a signal source 20 having a low-impedance output circuit is provided which may be coupled to a coil 21 which is wound around the plates 11 and 12. This connection can be made by a switch having a blade 22 and is made through a bias-current source 23 when the switch blade 22 is in the dotted position of the drawing. The bias-current source 23 is provided for the purpose of supplying a direct current to coil 21 which serves magnetically to bias the plate 11 to an optimum point for magnetostrictive operation. For the purpose of utilizing the magnetic energy associated with plate 11, there is provided a signal reproducer having a low-impedance input circuit which can be coupled to coil 21 through the bias-current source 23 when switch blade 22 is in the full-line position illustrated in the drawing. In this case the coil 21, of course, constitutes means for deriving the other type of energy, specifically magnetic energy, from the magnetostrictive material of plate 11.

In considering the operation of the device of Fig. 1, it will first be assumed that the switch blades 17 and 22 are in the full-line positions illustrated in the drawing. It will furthermore be assumed that bias-current source 23 provides a D. C. current in coil 21 which is effective to bias the magnetostrictive plate 11 to an optimum operating point on its characteristic. Under these conditions, the high-impedance signal source 16 is effective to supply electrical oscillations to terminals 14 and 15, which oscillations are in turn applied to the electromechanically sensitive plate 10 through the medium of the electrode 12 and the plate 11 acting as a second electrode. Under these conditions, any of the electrically sensitive materials mentioned above are effective to provide strains in the plate 10 along its length. The plate 11 is closely and rigidly coupled mechanically to the plate 10, as described, along its entire length and is effective, when the above-mentioned strains in plate 10 are coupled thereto mechanically, to provide magnetic energy in a manner which is well understood in the art. This magnetic energy induces voltages in coil 21 which are applied, through bias-current source 23 and switch 22, to the signal reproducer 25 which may, for example, be a cathode-ray tube, a voltmeter, loudspeaker, etc.

It will now be assumed that the switch blade 17 and the switch blade 22 are each closed to the dotted position illustrated in the drawing and that, again, the source 23 is adjusted to provide an optimum bias for the plate 11. Under these conditions, a signal from the low-impedance source 20 is applied to the coil 21, through the switch blade 22 and the bias-current source 23 and is effective, because of the magnetostrictive properties of the plate 11, to provide strains along the length of the plate. These strains, because of the close and rigid mechanical coupling between plates 10 and 11, are effective to cause voltages to be developed between electrode 12 and plate 11, also acting as an electrode for plate 10, which voltages are applied through switch blade 17 to the signal reproducer 19 wherein they are reproduced. Reproducer 19 again may be a cathode-ray tube, a voltmeter, a loudspeaker, etc. It may also be understood that either of the signal sources 16 and 20 may be an oscillation generator, a microphone, or any suitable source of electrical signals.

It will thus be seen that the arrangement of Fig. 1 comprises a device for transforming between electrical and magnetic types of energy and that this transformation may be from electrical energy to magnetic energy or from magnetic energy to electrical energy. It will also be seen that the material of the first body or plate 10 has the property of providing strains along a substantial dimension thereof, in this case the length, when electrical energy is applied thereto and that the second material in the second body or plate 11 is closely and rigidly coupled to the first material along a corresponding substantial dimension, actually as shown in the drawing along the entire length of the above-mentioned substantial dimension, and that the plate 11 has the property of providing, for strains therein, a magnetic energy output. Conversely, it is seen that the material of plate 11 has the property of providing strains therein along a substantial dimension when magnetic energy is applied thereto and that plate 10 is closely and rigidly coupled mechanically to the plate 11 along a major portion of the above-mentioned substantial dimension and has the property of providing an electrical energy output for strains therein. The device just described will be seen to have a particular utility in providing an impedance transformer between a high-impedance signal source 16 and a low-impedance signal reproducer 25. Alternatively, the device may be utilized to step up the impedance between a low-impedance signal source 20 and a high-impedance signal reproducer, such as illustrated at 19.

It was mentioned above that bias-current source 23 is utilized to provide a magnetic bias for plate 11 such that the plate 11 operates at an optimum point on its magnetostrictive characteristic. If desired, a switch 30 can be provided which is effective when closed to short out the terminals of bias-current source 23. The switch 30 is shown in dotted form in the drawing for the reason that its use in the circuit is optional. If the switch 30 is closed, shorting the terminals of bias source 23, the arrangement illustrated is then one which is suitable for operation with a magnetic bias which depends upon the residual magnetization of plate 11. In other words, plate 11 can be caused to have a residual magnetization which is effective to cause the plate to operate at an optimum point on its magneto-strictive characteristic.

Other modes of operation of the Fig. 1 arrangement are possible. Suppose, for example, that the switch 17 is in the position illustrated in the drawings but that switch 22 is operated to its dotted position. Under these conditions, electrical energy from signal source 16 is applied to the device, but there is also applied thereto magnetic energy from the low-impedance signal source 20. Perhaps it should be explained that the source 20 is actually an electrical source but that the energy resulting therefrom in the material 11 is magnetic energy. Applicant intends to draw this distinction between electrical energy in the material and magnetic energy in the material throughout the entire specification. Under the conditions just described, it is possible for plate 10 and plate 11 each to expand in the same direction. Therefore, the device illustrated becomes, under these conditions, an expander bar and can be used in applications where it is desired to convert energy from electrical sources to mechanical energy. On the other hand, if the polarity and magnitude of the electric and magnetic transducing coefficients are properly chosen with reference to the applied signals, it is easily possible for plate 11 to be caused to expand simultaneously with a contraction in plate 10. Under these conditions, the device just described becomes a bender in a manner which is well understood by those skilled in the art.

Consider now an operation of the device wherein switch 17 is operated to its dotted position and switch 22 is placed in the full-line position as indicated in the drawings. Under these conditions, the expander bar mentioned above can be mechanically actuated by means of arrangements well understood by those skilled in the art and an output can be taken from either or both of the plates 10 and 11. It will be understood that electrical energy at a high-impedance level is derived from plate 10 and that magnetic energy at a low-impedance level is derived from plate 11. Conversely, the bender arrangement mentioned above can, with the switches 17 and 22 in the positions last mentioned, be mechanically actuated in a manner well understood in the art. Here again an electrical output can be taken from plate 10, or a magnetic output can be derived from the plate 11 or, if it is desired, both outputs can simultaneously be obtained from the device.

The arrangement of Fig. 1, considered in its various modes of operation, can therefore be considered to be a device for transforming between at least two of the three types of energy classified herein as electrical, magnetic, and mechanical. The device comprises a first material in the plate 10 having the reversible property of transducing between electrical energy and strains along a substantial dimension of this material. The term "reversible property" as here used in intended to mean that this material can transduce between electrical energy and strains or between strains and electrical energy. The device also comprises a second material, namely the material of plate 11, which is rigidly and closely coupled mechanically to the material of plate 10 along a major portion of the substantial dimension mentioned above. This second material has the reversible property of transducing between magnetic energy and strains along this substantial dimension. In this case, the term "reversible property" means that the material can transduce between magnetic energy and strains, or can transduce between strains and magnetic energy. In the device of Fig. 1 there is also provided means for applying energy of at least one of the types mentioned above, namely, electrical energy, magnetic energy, or mechanical energy, to the device and there is also provided a means for deriving from the device energy of at least one of the other of these types of energy.

Figure 2:
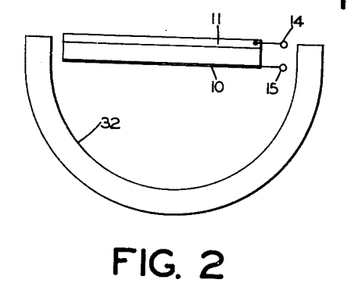
Fig. 2 illustrates a particular method of providing a magnetic bias for the embodiment of the invention illustrated in Fig. 1.

If desired, the magnetic bias for plate 11 can be provided by a permanent magnet. This is illustrated in Fig. 2 where only the plates 10 and 11 and their terminals have been illustrated, the remaining portions including the coil 21 of Fig. 1 having been omitted for the sake of simplicity.

Here a magnet 32 has been provided which is effective to provide flux in the plate 11 in the length direction thereof thereby to supply thereto the required magnetic bias.

Figure 3:
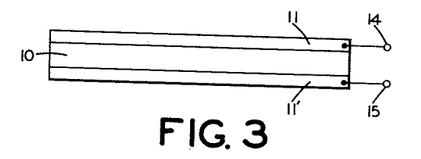
Figs. 3, 4, and 5 illustrate different forms of transducer structures which may be utilized in place of the structure illustrated in Fig. 1.

In Fig. 3 there is illustrated a form of the invention in which the plate structure is symmetrical about the electro-mechanically sensitive plate 10. Again many of the elements which were illustrated and described in detail in connection with Fig. 1 have been omitted for the sake of simplicity. In this case two magnetostrictive plates 11 and 11' have been provided, one on each side of the plate 10. It will be understood that each of the plates 11 and 11' are closely and rigidly mechanically coupled to the plate 10. In the modification of Fig. 3, the plate 11 can serve as one electrode for the plate 10 and the plate 11' can serve as the other electrode. Accordingly, therefore, the leads from terminals 14 and 15 are connected to plates 11 and 11', respectively.

Figure 4:
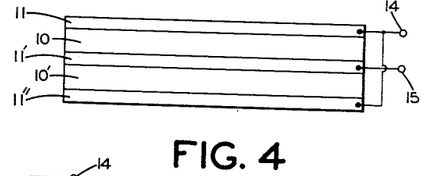

In Fig. 4 there is illustrated a modification of the invention which comprises, in addition to the electromechanically sensitive plate 10, a second electromechanically sensitive plate 10'. Also, in addition to the magnetostrictive plate 11, additional magnetostrictive plates 11' and 11'' are provided. It will be understood that there is a close and rigid mechanical coupling between plates 10 and 11, between plates 10 and 11', between plates 10' and 11' and between plates 10' and 11''. In this case, leads from the terminal 14 are connected to plates 11 and 11'' and a lead from the terminal 15 is connected to plate 11'. The plates 11 and 11' thus serve as electrodes for the plate 10 while the plates 11' and 11'' serve as electrodes for the plate 10'. Again many of the elements of Fig. 1 have been omitted for the sake of simplicity. It will be understood that additional plates can be provided in a structure similar to that of Fig. 3, and in some cases it may be desirable to provide a structure which is comprised of a large number of very thin layers of material, alternate layers having electrostrictive and magnetostrictive properties as taught above. It is understood, of course, that plates 10 and 10' of Fig. 4, in order to be effective, must develop voltages of equal polarity between their respective electrodes 11' and 11, and 11' and 11''.

Figure 5:
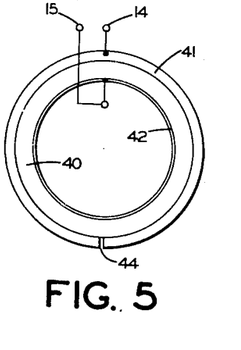

A still further modification of the invention is illustrated in Fig. 5. Here the electromechanically sensitive element corresponding to plate 10 of Fig. 1 is in the form of a cylinder 40. This form is somewhat inconvenient to fashion from many of the piezoelectric materials but can quite conveniently be obtained by the use of ceramics of the type mentioned above. The device of Fig. 5 also has a magnetostrictive member closely and rigidly mechanically coupled thereto. The magnetostrictive member has the form of a cylinder 41 which surrounds the cylinder 40. An electrode 42 is provided on the inside surface of the cylinder 40. Leads are brought out to terminals 14 and 15 from the electrostrictive cylinder 41 and the electrode 42, respectively.

It will be understood that any of the devices of Figs. 3, 4, and 5 may be operated in any of the manners described above in connection with Fig. 1 to translate between electric and magnetic energy and it will be specifically understood that any of the Figs. 3, 4, and 5 arrangements may have a coil corresponding to coil 21 of Fig. 1 for translating electrical energy associated with the magnetostrictive material of the device involved. In the case of the Fig. 5 embodiment, this coil may have the form of a toroid which is effective, upon the application of electrical currents thereto, to provide magnetic flux around the circumference of the structure shown. Since each of the devices which have been described depends in its action upon the transmission of strains in one of the materials involved to the other material involved, the device of Fig. 5 has some particularly desirable operating characteristics for some applications, due to the fact that the tendency for the cylinders to expand and contract in the radial direction results in very high circumferential stresses and thus in an increase in the output from the system. If the arrangement of Fig. 5 is provided with a gap 44 of rather narrow width so that flux may be introduced into the magnetostrictive ring 41, the device becomes a very sensitive one for measuring small magnetic fields in a manner which will be described more particularly hereinafter. For sufficient magnetostrictive effects the variation of the magnetic flux density in member 41 must be appreciable. However, the total flux available may be very small. In such cases, therefore, it becomes necessary to make the cross-section of the member 41 very small. In order to provide the proper strain transfer to member 40 in such a case, its cross section should also be very small.

Figure 6:
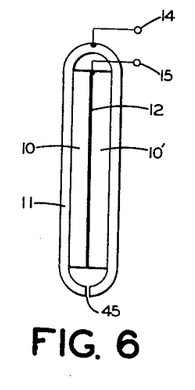
Fig. 6 illustrates a modification of the invention which is particularly well suited for measuring constant, or slowly varying, magnetic fields of very low intensity.

The structure of Fig. 6 is one which has some particular advantages where piezoelectric elements are used as the electromechanically sensitive material. Here, for example, there are provided two plates of piezoelectric material 10 and 10', both expanding in the same direction, having a common central electrode 12 between them. The magnetostrictive member 11 has the form of a hollow, almost wholly closed, loop around the piezoelectric elements 10, 10'. A small gap 45 is provided in order that flux can be introduced into the magnetic circuit of the device or can be derived therefrom. While the elements 10 and 10' have been described as piezoelectric elements, it will be understood that these elements can be of other material, such, for example, as electrostrictive material of the barium-titanate type mentioned above. The structure of Fig. 6 is, however, particularly well suited for the use of piezoelectric crystals because, in general, such elements must comprise flat plates. It will be noted that, in spite of the fact that flat plates are used in the Fig. 6 embodiment, the magnetic circuit involved is almost wholly closed as shown in the drawing. Actually for some applications the gap 45 can be omitted, thus causing the loop to be wholly closed. A structure of the Fig. 6 type having the gap 45 is well suited for use as a probe for exploring magnetic fields in a relatively small area. It will be noted, however, that the structure of Fig. 6 does not readily lend itself to the provision of a coil for providing a bias for the magnetic element 11 because of the fact that there is very little space inside the loop 11 for the coil windings. The arrangement of Fig. 6 is therefor particularly well suited to an application where the magnetic bias required is supplied by the remanent magnetism of the magnetostrictive material involved.

Figure 7:
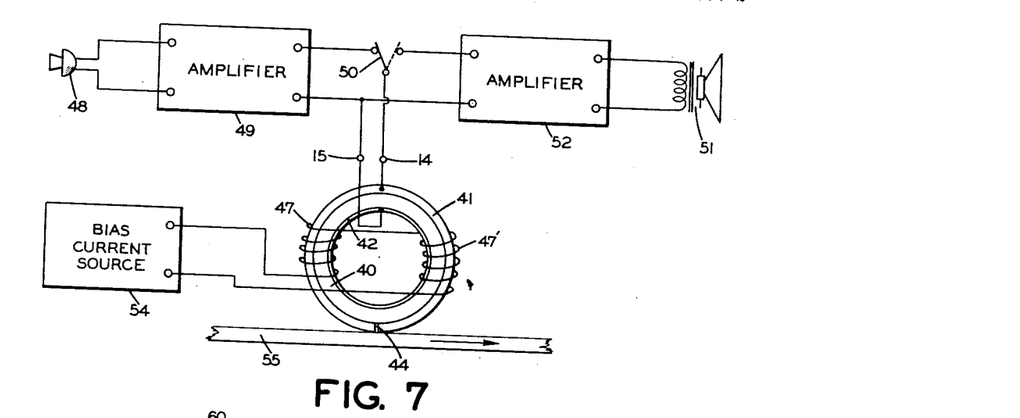
Fig. 7 illustrates an embodiment of the invention used as the recording and reproducing head in a magnetic recording system.

In Fig. 7 there is shown an embodiment of the invention utilized as the magnetic recording and reproducing head of a magnetic recorder. The structure involved here is generally similar to that described in connection with Fig. 5. However, a pair of coils 47, 47' has been provided in the Fig. 7 arrangement. In order to illustrate the use of the head as a recorder, a microphone 48 and an amplifier 49 are illustrated as being coupled to the input terminals 14, 15 when the blade 50 of a switch is in the position shown. In order to illustrate the operation of the device as a reproducer, a loudspeaker 51 and amplifier 52 are shown and the loudspeaker 51 may be coupled to the terminals 14, 15 through the amplifier 52 when the switch blade 50 is in the dotted position. A source of bias current 54 is provided for the windings 47, 47'. A magnetic record member 55 is illustrated. The record member 55 can take any of the forms which are used in magnetic recording such as a wire, tape, or disk. However, for the purposes of the present explanation, it will be considered to be a wire or tape which is driven by a suitable mechanism in the direction indicated by the arrow during either a recording or a reproducing operation.

In considering the operation of the arrangement of Fig. 7, it will be first assumed that the switch blade 50 is in the position illustrated and that bias-current source 54 is adjusted to provide a direct current to the coils 47, 47' which is suitable to bias the magnetostrictive material 41 to an optimum point on its operating characteristic. Sounds which are picked up by microphone 48 are converted therein to electrical currents of varying magnitude which are amplified by amplifier 49 and applied to terminals 14, 15. This has the effect of producing strains in electromechanically sensitive material 40 and, inasmuch as the ring 40 is closely and rigidly coupled to the magnetostrictive ring 41, the strains mentioned produce variations in the flux which is carried by the ring 41. These flux variations are effective at the air gap 44 to provide variations in the magnetism of the record member 55 as it travels along the gap 44 so that varying amounts of residual magnetism are present along the record member, depending upon the amplitude of the signals provided by microphone 48 at the time a particular portion of the record member passes the gap 44. There is thus provided in the record member 55 a magnetic record of the sounds which are applied to microphone 48 in a manner which is generally well understood by those skilled in the art. Also, as is well known in the art of magnetic recording, it is frequently desirable to provide a high-frequency signal superimposed on the rather low-frequency signals which are being recorded. In general, this high-frequency signal is introduced into the magnetic circuit of the recording head simultaneously with the application of the signal voltages to be recorded to the coil of the recording head. Accordingly, therefore, if it is desired to use this type of recording in the arrangement of Fig. 7, the bias current source 54 can be one which supplies signals of a high frequency to the coils 47, 47'. In some cases it may be advantageous to provide in bias-current source 54 a source of D. C. current as well as a source of high-frequency alternating current.

If, now, the switch blade 50 is moved to the dotted position shown in the drawing, magnetic records present in the record member 55 can be reproduced by the loudspeaker 51. The mechanism involved in this action is that the variations of residual magnetism in the record member 55 cause flux variations in the gap 44 which, in turn, cause flux variations in the magnetostrictive ring 41. These flux variations cause strains in the ring 41 due to the magnetostrictive effect and these strains in turn cause voltages to be generated in the electromechanically sensitive material 40. Electrical energy, therefore, may be derived from the terminals 14, 15 and applied to loudspeaker 51 through the amplifier 52 for reproduction. It will be understood that the use of the recording and reproducing arrangement of Fig. 7 in all ordinary cases involves a substantial range of audible frequencies, so that any pronounced natural mechanical resonances in the arrangement illustrated in Fig. 7 are to be avoided over such range of operating frequencies to prevent excessive frequency distortion of the sounds to be recorded and reproduced, as is well understood in this art. Accordingly, although the structure comprising the cylindrical bodies 40 and 41 may have one or more mechanical resonances at a predetermined frequency or frequencies, the predetermined operating frequencies of the aforementioned sound energy applied during recording, and later derived during reproduction, preferably are very substantially removed from such resonant frequency or frequencies.

Figure 8:
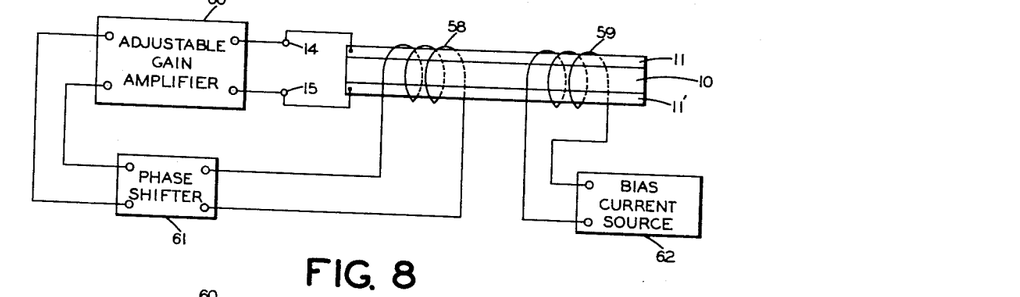
Figs. 8, 9, 10, and 11 illustrate modifications of the invention utilized in oscillators of different types.

In Fig. 8 there is shown an embodiment of the invention utilized in an oscillator circuit. The transducer structure of Fig. 8 is similar to that illustrated in Fig. 3 and similar elements have identical reference numerals. The transducer of Fig. 8, however, has two windings one of which is designated by the reference numeral 58 and is coupled to the input circuit of an adjustable gain amplifier 60 through a phase shifter 61. The second winding, designated by the numeral 59, is supplied with a current for biasing the magnetostrictive members 11, 11' by means of a source of bias current 62. The output terminals of adjustable gain amplifier 60 are coupled to terminals 14, 15 of the transducer.

In considering the operation of the oscillator of Fig. 8, it will be seen that the amplifier 60 is effective to supply signals to the elements 11 and 11' which act as electrodes for the electromechanically sensitive material 10. This causes strains to be produced in the electromechanically sensitive material which in turn cause, in the manner described above, magnetic flux variations in the plates 11 and 11'. These magnetic flux variations generate a voltage in the coil 58 which is supplied through the phase shifter 61 to the input circuit of the amplifier 60. Phase shifter 61 is provided so that the oscillations supplied by the coil 58 and fed back into the input circuit of the amplifier 60 can be suitably adjusted in phase to provide sustained oscillations in the system in a manner which, per se, is generally well understood by those skilled in the art.

Figure 9:
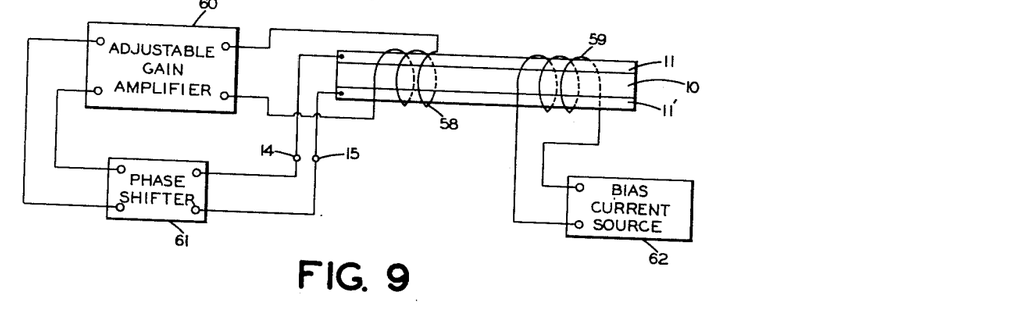

In Fig. 9 an oscillator is illustrated which is generally similar to that of Fig. 8, and similar circuit elements have identical reference numerals. The oscillator of Fig. 9, however, differs from that of Fig. 8 in that the output terminals of the adjustable gain amplifier 60 of Fig. 9 are coupled to the low-impedance winding 58 of the transducer. Accordingly, it is the high-impedance terminals 14, 15 of Fig. 9 which are coupled through the phase shifter 61 to the input circuit of the amplifier. It is believed that the method of operation of the Fig. 9 embodiment is obvious in view of the explanation given above with reference to Fig. 8.

Figure 10:
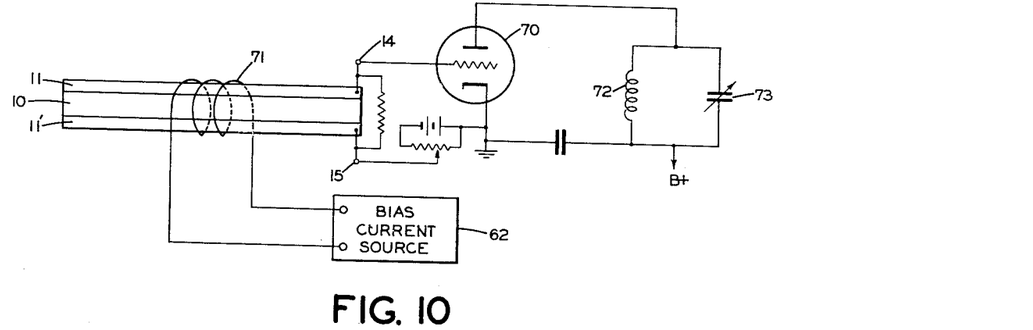

In Fig. 10 there is shown an oscillator which comprises an arrangement resembling those described above in the input circuit thereof. Here again, the transducer shown is generally similar to that of Fig. 3 and similar circuit elements have identical reference numerals. The oscillator of Fig. 10 comprises a vacuum tube 70 having an input circuit coupled to terminals 14, 15 of the transducer. Bias-current source 62 supplies a suitable bias current to a winding 71 of the transducer. The output circuit of tube 70 includes a resonant circuit 72, 73, the circuit being resonant at or about natural resonant frequency of the transducer illustrated. A suitable bias source and a suitable source of operating voltage are supplied for the tube 70.

In considering the operation of the circuit of Fig. 10, it will be seen that the transducer is effective to control the frequency of the oscillations in a manner generally similar to that which has been widely used in oscillator circuits using a quartz crystal. Here, however, frequency variations may be effected by varying the current supplied by the source 62, due to the fact that variations in this current cause variations in the strains which are introduced in the electromagnetic material of the transducer. Accordingly, therefore, the frequency of the circuit of Fig. 10 can be adjusted over a relatively narrow range by adjusting the current supplied by the source 62. In some cases it may be necessary simultaneously to adjust the value of the condenser 73 as the frequency of the oscillator is varied.

Figure 11:
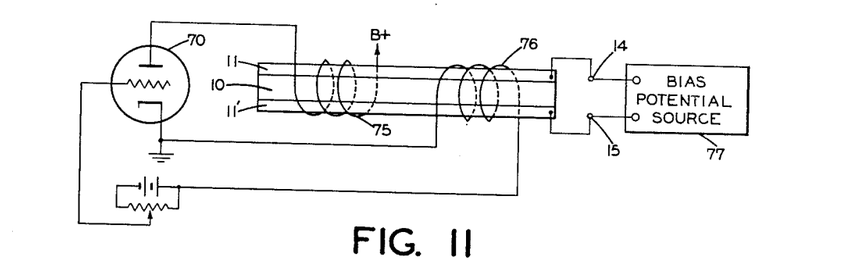

The circuit of Fig. 11 is an oscillator which is somewhat similar to that of Fig. 10 and similar circuit elements have identical reference numerals. Here, however, the transducer is connected in the output circuit of the tube 70 due to the fact that a coil 75 is connected in the anode circuit of tube 70. A coil 76 around the transducer is coupled in the grid cathode circuit of tube 70 in series with a suitable source of bias for the grid of the tube. The output terminals 14, 15 of the transducer are coupled to a source of bias potential 77.

In considering the operation of the oscillator of Fig. 11, it will be seen that variations of current in the anode circuit of the tube 70 cause variations in the magnetostrictive effect in the plates 11 and 11'. This variation in magnetism in turn causes a voltage to be induced in the coil 76 which is fed back to the grid circuit of tube 70. In this case, the source of bias potential 77 is used to adjust the transducing effect through the action of electromechanically sensitive plate 10. This has the effect of varying the strain and the operating point of plates 11 and 11' and in effectuating variations in the frequency and amplitude of the oscillations.

Figure 12:
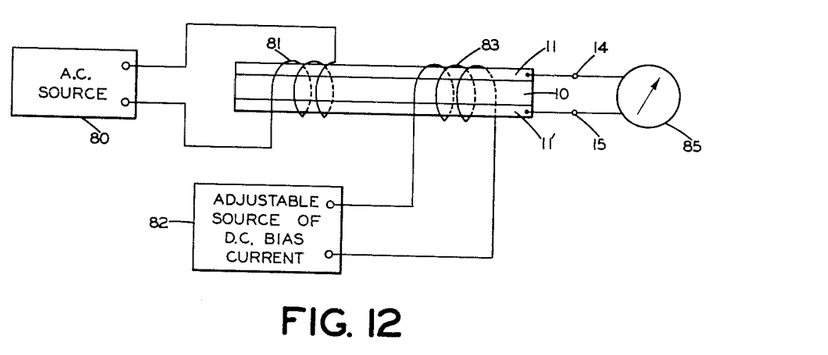
Fig. 12 illustrates a modification of the invention utilized to translate from magnetic energy at a rather low-impedance level to electrical energy at a rather high-impedance level; while Figs. 13 and 14 comprise curves showing certain operating characteristics of the modification of the invention illustrated in Fig. 12.
Figure 13:
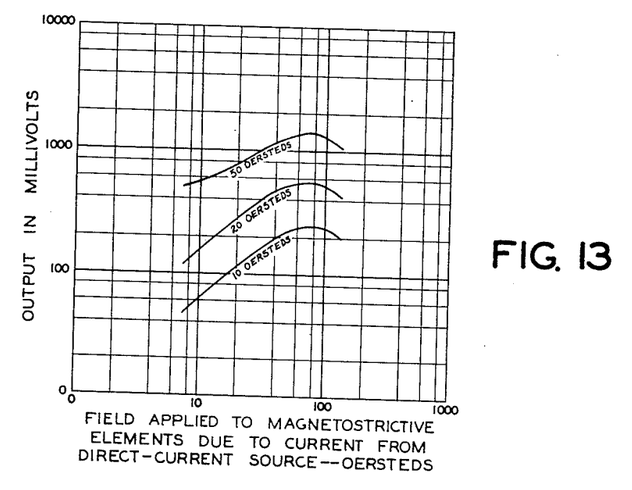
Figure 14:
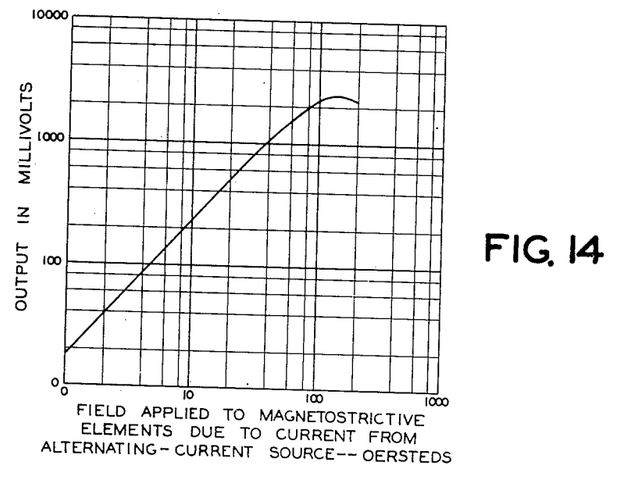

In Fig. 12 there is illustrated a transducer of the general type described above in connection with Fig. 3 to which an A. C. signal source 80 is applied by means of a winding 81 around the transducer. There is also provided an adjustable source of D. C. bias current 82 which supplies a current through a second coil 83 on the transducer. In this case, the signal reproducer is represented by a voltmeter 85. The operating characteristics for a particular device, constructed in accordance with the Fig. 12 embodiment, are shown in the curves of Figs. 13 and 14. In the particular embodiment under consideration, the electromechanically sensitive plate 10 consisted of a polarized strip of barium titanate 1½" long, 1/16" wide, and 1/16" thick. The magnetostrictive plates 11 and 11' of this arrangement comprised annealed nickel strips 1½" long, 1/16" wide, and 0.030" thick. The bonding was done by soldering the nickel strips to metallized faces of the barium titanate strip. The nickel strips served as electrodes for the ceramic material as described above. A source of 60 cycles signals was provided for energizing coil 81. Under these conditions the curves of Fig. 13 indicate the electrical output of the transducer for various bias-field strengths obtained by adjusting the D. C. current supplied by source 82. Specifically, the source 80 was adjusted to provide an alternating flux of 50 oersteds the members 11 and 11' and the direct current field supplied by source 82 was varied and the output obtained for each setting was obtained from meter 85 in order to obtain the upper curve of Fig. 13. The two lower curves were obtained in a similar manner but using, in each case, a different output from A. C. source 80. It will be seen that a maximum output is obtained in each case when the bias field strength due to the source 82 is about 80 oersteds. The curve of Fig. 14 represents the characteristic of the arrangement with varying amplitudes of A. C. signal input from source 80 for a bias field strength which is adjusted to the optimum value of 80 oersteds mentioned above.

The relationship between the respective thicknesses of the piezoelectric (or electrostrictive) and the magnetostrictive layers of the various transducer elements in accordance with the present invention is always determined by the same basic considerations, namely, the intended application and relative stiffness of the two materials.

In applications where electrostatic output only is desired, the driving (magnetostrictive) layer will, obviously, be chosen so that its total stiffness is great in comparison with that of the driven (piezoelectric) material in order to make full use of the basically available magnetostrictive dimensional change. In other words, the driving material should be restrained as little as possible by the driven material.

In the converse case, when magnetic output only is desired, the stiffness of the piezoelectric (or electrostrictive) material should be large compared to that of the piezoelectric material.

In cases when the transducer element is to be used alternatively in either direction the stiffnesses of the two materials will be chosen to be about the same, representing the best compromise solution.

While there have been described what are at present considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A device for transforming between at least two of the types of energy classified as electrical, magnetic and mechanical comprising: a first material having the reversible property of transducing between electrical energy and strains along a substantial dimension in the said first material; a second material closely and rigidly coupled mechanically to said first material along a major portion of said substantial dimension and having the reversible property of transducing between magnetic energy and strains along said substantial dimension of said second material and forming with said first material a system which is mechanically resonant at a predetermined frequency; means for applying energy of at least one of said types to said device at predetermined frequencies which are substantially removed from said predetermined frequency, and means for deriving from said device and utilizing energy of at least one of the other of the above-mentioned types at said predetermined frequencies of said applied energy.

2. A device for transforming between electrical and magnetic types of energy, comprising: a first body of a first material which has the property of providing strains therein along a substantial dimension of said body when energy of one of said types is applied thereto; a second body of a second material, which has a substantial dimension closely and rigidly coupled mechanically to said first body along said substantial dimension of said first body, and which has the property of providing, for strains along said substantial dimension of said second body, energy of the other of said types; means for applying energy of said one of said types to said first material to develop strains along said substantial dimension of said first body and corresponding coupled strains along said substantial dimension of said second body; and means for deriving from said second material the energy of said other of said types developed therein as a result of said last-mentioned coupled strains therein.

3. A device for transforming between electrical and magnetic types of energy, comprising: a first body of a first material which has the property of providing strains therein along a substantial dimension of said body when energy of one of said types is applied thereto; a second body of a second material, which has a substantial dimension closely and rigidly coupled mechanically to said first body along said substantial dimension of said first body, which has the property of providing, for strains along said substantial dimension of said second body, energy of the other of said types, and which forms with said first body a system which is mechanically resonant at a predetermined resonant frequency; means for applying energy of said one of said types to said first material at operating frequencies substantially removed from said resonant frequency to develop strains along said substantial dimension of said first body and corresponding coupled strains along said substantial dimension of said second body; and means for deriving from said second material the energy of said other of said types developed therein at said operating frequencies as a result of said last-mentioned coupled strains therein.

4. A device for transforming magnetic energy into electrical energy, comprising: a first body of a first material which has the property of providing strains therein along a substantial dimension of said body when magnetic energy is applied thereto; a second body of a second material, which has a substantial dimension closely and rigidly coupled mechanically to said first body along said substantial dimension of said first body, and which has the property of providing, for strains along said substantial dimension of said second body, electrical charges on two opposed surfaces of said second body; means for applying magnetic energy to said first material to develop strains along said substantial dimension of said first body and corresponding coupled strains along said substantial dimension of said second body; and means coupled to said two surfaces of said second body for deriving from said second material the electrical energy developed therein as a result of said last-mentioned coupled strains therein.

5. A device for transforming electrical energy into magnetic energy, comprising: a first body of a first material which has the property of providing strains therein along a substantial dimension of said body when electrical potentials are applied between two opposed surfaces of said body; a second body of a second material, which has a substantial dimension closely and rigidly coupled mechanically to said first body along said substantial dimension of said first body, and which has the property of providing magnetic energy for strains along said substantial dimension of said second body; means for applying electrical potentials between said two surfaces of said first body to supply electrical energy to said first material for developing strains along said substantial dimension of said first body and corresponding coupled strains along said substantial dimension of said second body; and means for deriving from said second material the magnetic energy developed therein as a result of said last-mentioned coupled strains therein.

6. A device for transforming between electrical and magnetic types of energy, comprising: a first body of a first material which has the property of providing strains therein along a substantial dimension of said body when energy of one of said types is applied thereto; a second body of a second material, which has a substantial dimension closely and rigidly coupled mechanically to said first body along said substantial dimension of said first body, and which has the property of providing, for strains along said substantial dimension of said second body, energy of the other of said types; and means, including a coil around at least one of said bodies for translating the magnetic energy involved and including electrodes on at least the other of said bodies for translating the electrical energy involved, for applying energy of said one of said types to said first material to develop strains along said substantial dimension of said first body and corresponding coupled strains along said substantial dimension of said second body and also for deriving from said second material the energy of said other of said types developed therein as a result of said last-mentioned coupled strains therein.

7. A device for transforming between electrical and magnetic types of energy, comprising: a first body of a first material which has the property of providing strains therein along a substantial dimension of said body when energy of one of said types is applied thereto; a second body of a second material, which has a substantial dimension closely and rigidly coupled mechanically to said first body along said substantial dimension of said first body, and which has the property of providing, for strains along said substantial dimension of said second body, energy of the other of said types; means, including a coil around at least one of said bodies, for magnetically biasing the one of said materials which transduces magnetic energy to an optimum point of its transducing characteristic; means for applying energy of said one of said types to said first material to develop strains along said substantial dimension of said first body and corresponding coupled strains along said substantial dimension of said second body; and means for deriving from said second material the energy of said other of said types developed therein as a result of said last-mentioned coupled strains therein.

8. A device for transforming between electrical and magnetic types of energy, comprising: a first body of a first material which has the property of providing strains therein along a substantial dimension of said body when energy of one of said types is applied thereto; a second body of a second material, which has a substantial dimension closely and rigidly coupled mechanically to said first body along said substantial dimension of said first body, and which has the property of providing, for strains along said substantial dimension of said second body, energy of the other of said types; means, including a permanent magnet, for magnetically biasing the one of said materials which transduces magnetic energy to an optimum point of its transducing characteristic; means for applying energy of said one of said types to said first material to develop strains along said substantial dimension of said first body and corresponding coupled strains along said substantial dimension of said second body; and means for deriving from said second material the energy of said other of said types developed therein as a result of said last-mentioned coupled strains therein.

9. A device for transforming between electrical and magnetic types of energy, comprising; a first body of a first material which has the property of providing strains therein along a substantial dimension of said body when energy of one of said types is applied thereto; a second body of a second material, which has a substantial dimension closely and rigidly coupled mechanically to said first body along said substantial dimension of said first body, and which has the property of providing, for strains along said substantial dimension of said second body, energy of the other of said types, one of said materials being an electromechanically sensitive ceramic dielectric material polarized to provide an optimum transducing characteristic; means for applying energy of said one of said types to said first material to develop strains along said substantial dimension of said first body and corresponding coupled strains along said substantial dimension of said second body; and means for deriving from said second material the energy of said other of said types developed therein as a result of said last-mentioned coupled strains therein.

10. A device for transforming between electrical and magnetic types of energy, comprising: a first body of a first material which has the property of providing strains therein along a substantial dimension of said body, said dimension being effectively a substantially closed loop, when energy of one of said types is applied thereto; a second body of a second material, which has a substantial dimension closely and rigidly coupled mechanically to said first body along said substantial dimension of said first body, and which has the property of providing, for strains along said substantial dimension of said second body, energy of the other of said types; means for applying energy of said one of said types to said first material to develop strains along said substantial dimension of said first body and corresponding coupled strains along said substantial dimension of said second body; and means for deriving from said second material the energy of said other of said types developed therein as a result of said last-mentioned coupled strains therein.

11. A device for transforming between electrical and magnetic types of energy, comprising: a composite structure of three bodies, including an inner transducer body of a first material having two opposed surfaces, to each of which is closely and rigidly coupled mechanically, along a substantial dimension of said structure, a surface of an individual outer transducer body of a second material, one of the said first and second materials having the property of providing strains along said substantial dimension therein when energy of one of said types is applied thereto, and the other of the said materials having the property of providing, for strains along said substantial dimension therein, energy of the other of said types; means for applying energy of said one type to said one material to develop strains along said substantial dimension in that material adjacent to both of said opposed surfaces, with the development of corresponding coupled strains along said substantial dimension in the other material adjacent to both of said opposed surfaces; and means for deriving from said other material the energy of said other of said types developed therein as a result of the last-mentioned coupled strains therein.

12. A device for transforming between electrical and magnetic types of energy, comprising: a composite structure of three bodies, including an inner transducer body of a first material having two opposed surfaces, to each of which is closely and rigidly coupled mechanically, along a substantial dimension of said structure, a surface of an individual outer transducer body of a second material, said first material having the reversible property of transducing between electrical energy and strains along said substantial dimension therein, and said second material having the reversible property of transducing between magnetic energy and strains along said substantial dimension therein; means for applying energy of one of said types to said structure to develop strains along said substantial dimension adjacent to both of said opposed surfaces in the one of said materials having the property of transducing between said one type of energy and such strains, with the development of corresponding coupled strains along said substantial dimension in the other of said materials adjacent to both of said opposed surfaces; and means for deriving from said other material the energy of the other of said types developed therein as a result of the last-mentioned coupled strains therein.

References Cited in the file of this patent

UNITED STATES PATENTS

| Number | Name | Date |
|---|---|---|
| 1,841,459 | Taylor | Jan. 19, 1932 |
| 2,101,272 | Scott | Dec. 7, 1937 |
| 2,486,560 | Gray | Nov. 1, 1949 |
| 2,551,848 | Parker | May 8, 1951 |
| 2,571,019 | Donley | Oct. 9, 1951 |
| 2,573,168 | Mason et al. | Oct. 30, 1951 |
| 2,636,135 | Peek | Apr. 21, 1953 |